(12) United States Patent
Wilkins

(10) Patent No.: US 11,421,785 B2
(45) Date of Patent: Aug. 23, 2022

(54) RETAINER FOR UNITARY SEAL ASSEMBLY

(71) Applicant: AKTIEBOLAGET SKF, Gothenburg (SE)

(72) Inventor: John Arthur Wilkins, Chicago, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 3 days.

(21) Appl. No.: 17/154,659

(22) Filed: Jan. 21, 2021

(65) Prior Publication Data

US 2021/0239217 A1    Aug. 5, 2021

Related U.S. Application Data

(60) Provisional application No. 62/968,097, filed on Jan. 30, 2020.

(51) Int. Cl.
*F16J 15/3268*    (2016.01)

(52) U.S. Cl.
CPC ................ *F16J 15/3268* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3212; F16J 15/3216; F16J 15/322; F16J 15/3228; F16J 15/3232; F16J 15/3248; F16J 15/3252; F16J 15/3256; F16J 15/3264; F16J 15/3268; F16J 15/3276

USPC ........................................................ 277/500
See application file for complete search history.

(56) References Cited

U.S. PATENT DOCUMENTS

| | | | |
|---|---|---|---|
| 5,326,112 A * | 7/1994 | Paykin .................. | F16J 15/166 277/944 |
| 9,689,496 B2 * | 6/2017 | Wilkins ............... | F16J 15/3248 |
| 2015/0295466 A1 * | 10/2015 | Gonzales Bernal .... | F16C 33/76 310/90 |
| 2016/0298769 A1 * | 10/2016 | Angiulli ............... | F16C 33/805 |

* cited by examiner

*Primary Examiner* — Nathan Cumar
(74) *Attorney, Agent, or Firm* — J-Tek Law PLLC; Scott T. Wakeman; Mark A. Ussai

(57) ABSTRACT

A seal assembly is for sealing an annular space between a shaft and a housing, the housing having a bore and a radial end surface extending outwardly from the bore. The seal assembly includes an outer case disposeable within the housing bore, configured to support a primary seal member and having a radially-outwardly extending flange disposeable against the housing radial surface, the flange defining an annular groove. An inner case is disposed within the outer case and is disposeable upon the shaft. An annular retainer formed of a rigid polymeric material has an outer radial end disposed within the flange groove, an inner radial end disposeable about the shaft and a radial retention surface. The retainer retention surface extends between the inner and outer ends and is contactable by the inner case so as to retain the inner case disposed within the outer case.

18 Claims, 4 Drawing Sheets

RETAINER FOR UNITARY SEAL ASSEMBLY

CROSS-REFERENCE

This application claims the benefit of U.S. Provisional Application No. 62/968,097, filed Jan. 30, 2020.

BACKGROUND OF THE INVENTION

The present invention relates to seals, and more particularly to unitary radial lip seal assemblies.

Unitary seal assemblies typically include inner and outer cases and at least one primary radial lip seal, and are often provided with additional sealing lips or/and dust lips. The outer case is installable within a housing bore and usually carries the primary seal member and the inner case is mountable upon a shaft and provides a circumferential engagement surface for the primary seal. To prevent disassembly of the unitary seal during transport or installation, such seal assemblies may be provided with some means to retain the inner case disposed within the outer case.

SUMMARY OF THE INVENTION

In one aspect, the present invention is a retainer for a unitary seal assembly for sealing an annular space between a shaft and a housing, the seal assembly including an outer annular case with a flange and an inner annular case disposed within the outer annular case. The retainer comprises an annular body formed of a rigid polymeric material and having a centerline, an outer radial end coupled with the flange of the outer annular case, and an inner radial end disposable about the shaft. A radial retention surface extends between the inner and outer ends and is contactable by the inner annular case so as to retain the inner annular case disposed within the outer annular case.

In another aspect, the present invention is a seal assembly for sealing an annular space between a shaft and a housing, the housing having a bore and a radial end surface extending outwardly from the bore. the seal assembly comprises an outer annular case disposeable within the housing bore, configured to support a primary seal member and having a radially-outwardly extending flange disposeable against the housing radial surface, the flange defining an annular groove. An inner annular case is disposed within the outer annular case and is disposeable upon the shaft. Further, a retainer includes an annular body with a centerline, an outer radial end disposed within the groove of the flange, an inner radial end disposeable about the shaft and a radial retention surface extending between the inner and outer ends and contactable by the inner annular case so as to retain the inner annular case disposed within the outer annular case.

In a further aspect, the present invention is again a seal assembly for sealing an annular space between a shaft and a housing, the housing having a bore and a radial end surface extending outwardly from the bore. The seal assembly comprises an outer annular case disposeable within the housing bore and including an outer axial portion having opposing first and second axial ends, a flange extending outwardly from the first axial end of the outer axial portion and defining an annular groove, a radial portion extending inwardly from the second axial end of the outer axial portion and a seal mounting portion extending axially from the radial portion and toward the first axial end. An inner annular case includes an inner axial portion disposeable about the shaft outer surface, a radial portion extending radially outwardly from the inner axial portion and an outer axial portion extending from an outer end of the radial portion and disposed about the seal mounting portion of the outer case. A primary sealing member is attached to the seal mounting portion of the outer annular case and is sealingly engageable with the inner axial portion of the inner annular case. Further, a retainer includes an annular body with a centerline, an outer radial end disposed within the flange groove, an inner radial end disposeable about the shaft groove and a radial retention surface extending between the inner and outer ends and contactable by the inner case so as to retain the inner case disposed within the outer case.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
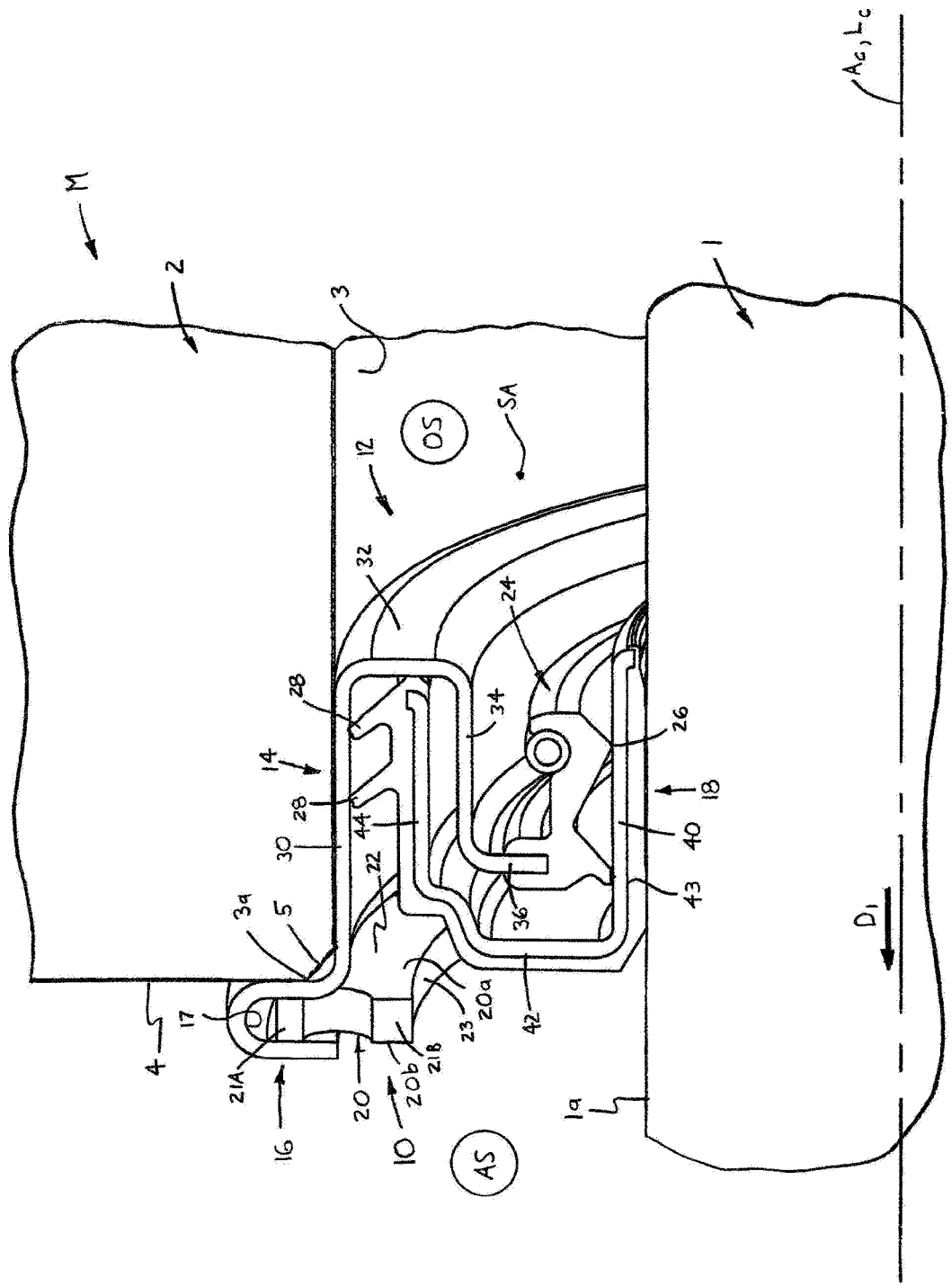
FIG. 1 is broken-away, perspective view of a seal assembly and a retainer in accordance with the present invention, shown installed about a shaft and within a housing.

Referring now to the drawings in detail, wherein like numbers are used to indicate like elements throughout, there is shown in FIGS. 1-4 a retainer 10 for a unitary seal assembly 12 for sealing an annular space SA between a shaft 1 and a housing 2 of a machine or machine component M, specifically to prevent flow between an air side AS and an oil side OS of the machine/machine component M, as indicated in FIG. 1. The shaft 1 is rotatable about a central axis $A_C$ and has an outer surface 1a and the housing 2 has a bore 3 and a radial end surface 4 extending outwardly from an axial end 3a of the bore 3. As described in further detail below, the seal assembly 12 comprises an outer case 14 disposeable within the housing bore 3 and including a radially-outwardly extending flange 16 with an annular groove 17, and an inner case 18 disposed within the outer case 14 and disposeable about the shaft 1. The retainer 10 comprises an annular body 20 with a centerline $L_C$, which is preferably at least generally coaxial with the shaft axis $A_C$ when installed thereabout, and is formed of a rigid polymeric material, preferably PA 66 with glass fibers, but may be any other appropriate rigid polymer, such as for example, Nylon, Delrin, Acetal, etc. The retainer annular body 20 has an outer radial end 21A coupled with the flange 16 of the outer case 14, an inner radial end 21B disposable about the shaft 1 and defining a central bore 23 with an inside diameter $ID_R$, and opposing first and second axial ends 20a, 20b, respectively. The outer radial end 21A of the retainer annular body 20 is disposed within the annular groove 17 of the outer case flange 16 and the inner end 21B is disposed about, and spaced radially outwardly from, the shaft 1.

Further, the retainer body 20 has a radial retention surface 22 provided on the first axial end 21a and extending between the body inner and outer radial ends 21A, 21B, respectively. The retention surface 22 is contactable by the inner annular case 18 so as to retain the inner case 18 disposed within the outer annular case 14. In other words, the retainer 10 is engageable with the inner annular case 18 to prevent axial displacement of the case 18 in a first direction $D_1$ (FIG. 1) along the centerline $L_C$. Specifically, the retainer 10 is sized diametrically such that the retainer inside diameter $ID_R$ has a value less than a value of an outside diameter $OD_C$ of the inner annular case 18, as indicated in FIG. 3, such that at least a portion of the radial retention surface 22 extends radially inwardly of the inner annular case 18.

Thereby, the retainer 10 prevents disengagement of the components of the unitary seal assembly 12 during transportation, installation, demounting, etc., and also functions as a shroud or shield during use of the seal assembly 12 to prevent entry of solid or semi-solid particles (e.g., mud) and minimize fluid flow into the seal cases 14, 16 from the air side AS. However, as the retainer 10 only functions as a very simple shroud or labyrinth seal, the retainer body 20 preferably further includes a plurality of drainage passages 29 extending axially between the first and second axial ends 20a, 20b of the annular body 20 and spaced circumferentially about the centerline $L_C$. Thus, any fluids (and/or solids) that pass into the seal assembly 12 through the retainer bore 23 are able to drain outwardly from the seal assembly 12 through the passages 29.

Figure 2:
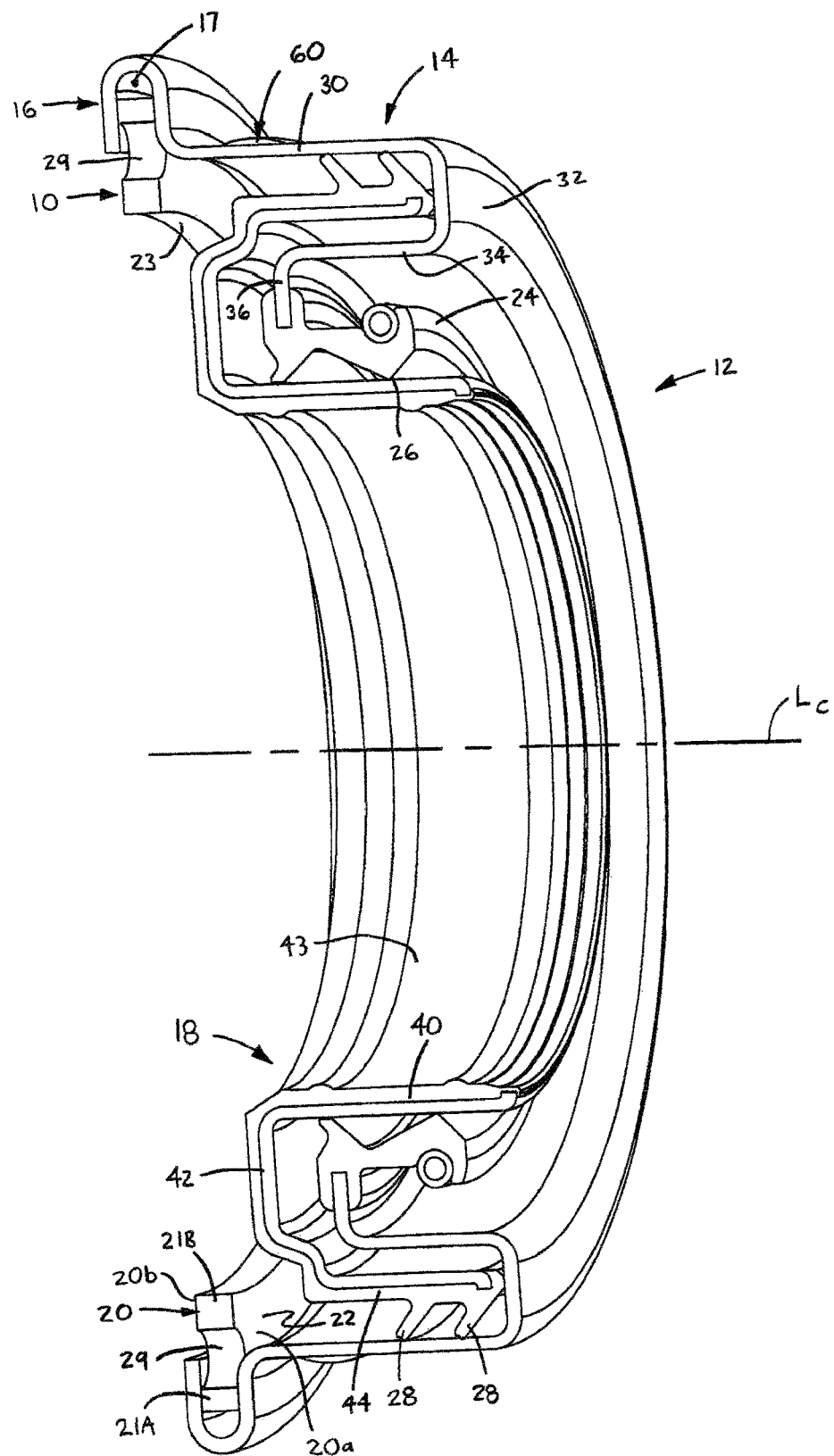
FIG. 2 is an axial cross-sectional view in perspective of the seal assembly and retainer.
Figure 3:
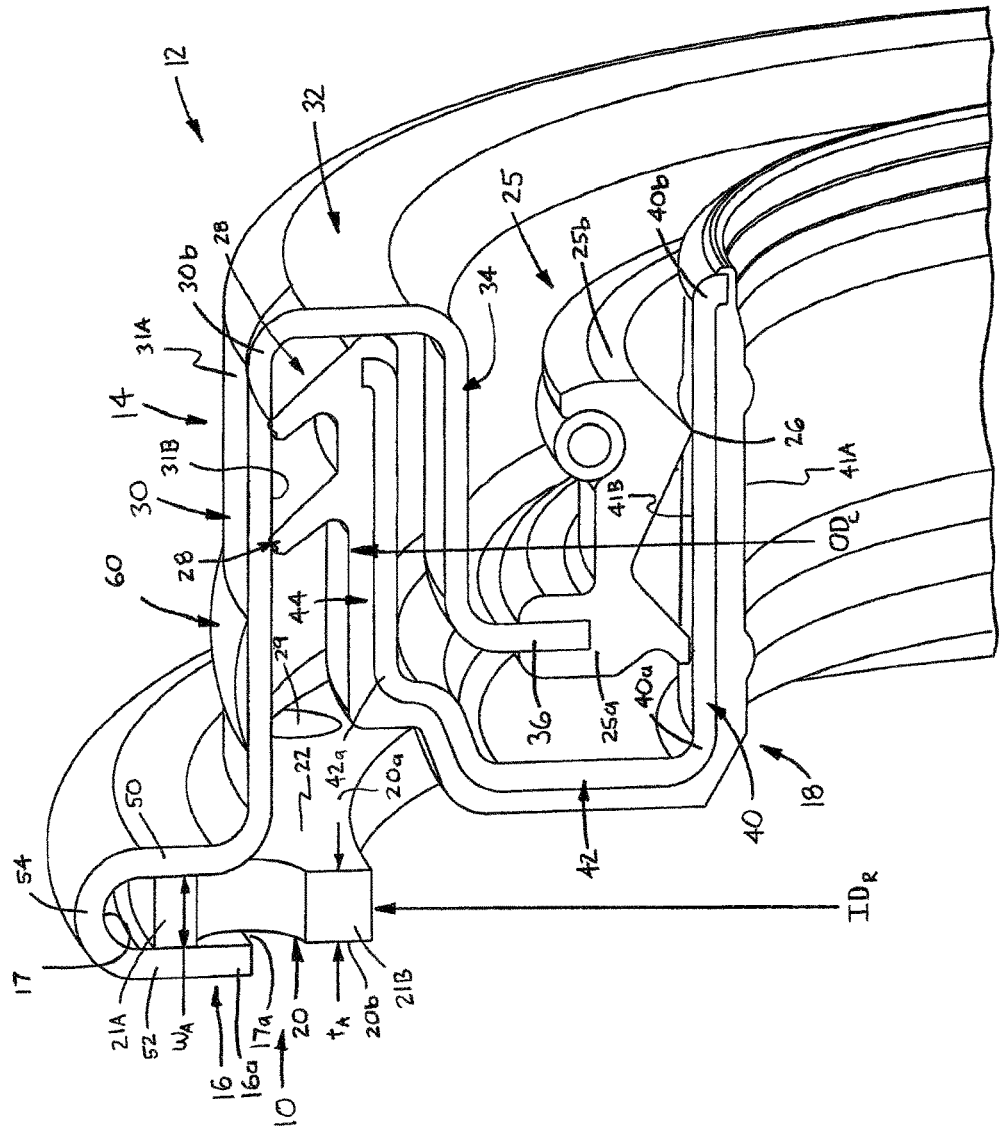
FIG. 3 is an enlarged, broken-away view of an upper portion of FIG. 2.
Figure 4:
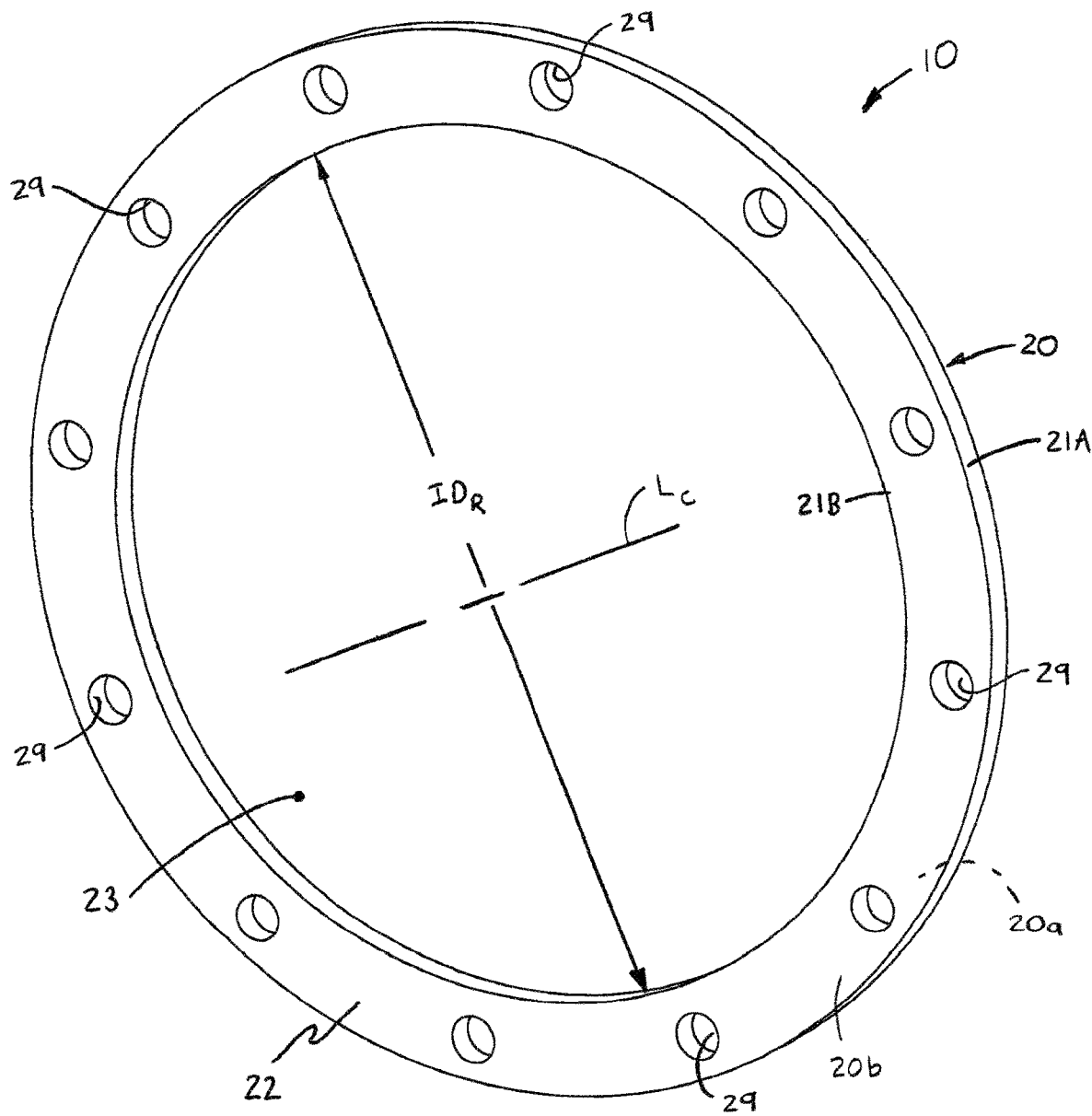
FIG. 4 is a perspective view of the retainer, shown separate from the seal assembly.

Referring to FIGS. 2 and 3, the outer annular case 14 of the seal assembly 12 is configured to support a primary seal member 24, and when installed within the bore 3, the flange 16 of the outer case 14 is disposeable against the housing radial surface 4 to locate the seal assembly 12 at a desired position within the housing 2. More specifically, the outer case 14 preferably includes an outer axial portion 30 having opposing first and second axial ends 30a, 30b, the flange 16 extending outwardly from the first end 30a, an outer circumferential surface 31A frictionally engageable with the housing bore 3 and an opposing inner circumferential surface 31B. A radial portion 32 of the outer annular case 14 extends inwardly from the second axial end 30b of the outer axial portion 30 and a seal mounting portion 34 extends axially from the radial portion 32 and toward the first axial end 30a. Preferably, the seal mounting portion 34 has a radial end section 36 adapted to receive the primary seal 24, which is preferably a standard, generally wedge-shaped radial lip seal 25 having an inner end 25a attached to the end section 36 and an outer, free end 25b providing an inner circumferential sealing edge or surface 26.

Further, the inner annular case 18 preferably includes an inner axial portion 40 disposeable about the shaft outer surface 1a and has opposing first and second axial ends 40a, 40b, an inner circumferential surface 41A defining a bore 43 and frictionally engageable with the shaft 1, and an outer circumferential "seal engagement" surface 41B. The inner annular case 18 is positioned within the outer annular case 14 such that the sealing surface 26 of the primary seal 24 is sealingly engageable with the seal engagement surface 41B of the inner axial portion 40. A radial portion 42 extends radially outwardly from the first end 40a of the inner axial portion 40 and an outer axial portion 44 extends from an outer end 42a of the radial portion 42. When the outer and inner cases 14, 18 are assembled together, the outer axial portion 44 of the inner case 18 is disposed about, and spaced radially outwardly from, the seal mounting portion 34 of the outer case 14. Preferably, at least one and most preferably two secondary seal lips 28 are each coupled with the outer axial portion 44 of the inner case 18 and are each sealingly engageable with the inner circumferential surface 31B of the outer axial portion 30 of the outer case 14.

Referring particularly to FIG. 3, the flange 16 of the outer case 14 is preferably formed having a first radial section 50 connected with a remainder of the outer annular case 14, a second radial section 52 spaced axially from the first radial section 50, and a curved, radially-outermost central section 54 extending between and connecting the first and second radial sections 50, 52, respectively. The flange groove 17 is defined between the first and second radial sections 50, 52 and having an open inner radial end 17a facing generally toward the centerline $L_C$, the retainer annular body 20 extending radially inwardly from the inner end 17a of the groove 17. Further, the groove 17 of the flange 16 has an axial width $w_A$ defined between the flange first and second radial sections 50, 52 and the retainer 10 has an axial thickness $t_A$, with the retainer 10 preferably being sized such that the retainer thickness $t_A$ is greater than the flange width $w_A$. As such, the two flange radial sections 50, 52 preferably frictionally engage with the retainer 10 to secure the retainer 10 within the groove 17.

Referring now to FIGS. 2 and 3, the seal assembly 12 preferably further comprises a gasket 60 disposed about the outer circumferential surface 31A of the outer case axial portion 30 and disposed adjacent to the flange 16. Specifically, the gasket 60 is a preferably a "flow on gasket" ("FOG") and is positioned to seal between an end chamfer 5 (FIG. 1) of the housing bore 3 and the flange 16 of the outer case 14. With the flange 16 extending completely circumferentially about the outer case 14, the flange 16 prevents any extrusion of the gasket 60 outwardly from the housing bore 3. Further, the inner case 18 preferably has an annular elastomeric layer 64 disposed on the inner circumferential surface 41A of the inner axial portion 40. The layer 64 functions to both increase frictional engagement between the shaft 1 and the case 18 and provides a seal between the case inner surface 41A and the shaft outer surface 1a.

The seal assembly 12 of the present invention has a number of advantages over previously known unitary seal assemblies. Being formed of a rigid polymeric material, the cost of producing the retainer 10 is substantially lesser than the fabrication costs of known retainers formed of metallic materials, as well as the polymeric retainer 10 being free of corrosion or rust. Also, by inserting the retainer radial outer end 21A into the flange groove 17 to couple the retainer 10 with the outer casing 14, the chances of dislodging or disengaging the retainer 10 from the seal assembly 12 are substantially lesser than if the retainer were bended over or around the flange as with certain known retainer devices. Further, by providing the drainage passages 29, any fluids passing into the seal assembly 12 from the machine air side AS are able to flow back out of the seal assembly 12 through the retainer 10. Finally, by providing a separate retainer 10 as opposed to inwardly bending portions of the flange to retain the inner case as in certain prior art seal assemblies, extrusion of the preferred gasket 60 is prevented.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments and may be varied within the scope of the following claims.

I claim:

1. A retainer for a unitary seal assembly for sealing an annular space between a shaft and a housing, the seal assembly including an outer annular case with a flange and an inner annular case disposed within the outer annular case, the retainer comprising:
    an annular body formed of a rigid polymeric material and having a centerline, an outer radial end coupled with the flange of the outer annular case, an inner radial end disposable about the shaft and a radial retention surface extending between the inner radial end and the outer radial end and contactable by the inner annular case such that the annular body retains the inner annular case disposed within the outer annular case;
    wherein the annular body has first and second axial ends, the radial retention surface being provided on the first axial end, and a plurality of axial drain passages extending between the first axial end and the second axial end and spaced circumferentially about the centerline of the annular body.

2. The retainer as recited in claim 1 wherein the outer radial end of the retainer annular body is disposed within an annular groove formed in the flange of the outer annular case.

3. The retainer as recited in claim 1 wherein the annular body has a central bore with an inside diameter having a value less than a value of an outside diameter of the inner annular case such that at least a portion of the radial retention surface extends radially inwardly of the inner annular case.

4. The retainer as recited in claim 1 wherein the centerline of the annular body is at least generally coaxial with a central axis of the shaft and the inner radial end of the annular body is spaced radially outwardly from an outer circumferential surface of the shaft when the seal assembly is disposed about the shaft.

5. A seal assembly for sealing an annular space between a shaft and a housing, the housing having a bore and a radial end surface extending outwardly from the bore, the seal assembly comprising:
    an outer annular case disposeable within the housing bore, configured to support a primary seal member and having a radially-outwardly extending flange disposeable against the housing radial end surface, the flange defining an annular groove, an outer axial portion having opposing first and second axial ends, the flange extending radially outwardly from the first axial end of the outer axial portion, a radial portion extending radially inwardly from the second axial end of the outer axial portion, and a seal mounting portion extending axially from the radial portion and toward the first axial end;
    an inner annular case disposed within the outer annular case and disposeable upon the shaft, the inner annular case including an inner axial portion disposeable about the shaft outer surface, a radial portion extending radially outwardly from the inner axial portion and an outer axial portion extending from an outer end of the radial portion and disposed about and spaced radially outwardly from the seal mounting portion of the outer annular case; and
    a retainer including an annular body with a centerline, an outer radial end disposed within the annular groove of the flange, an inner radial end disposeable about the shaft and a radial retention surface extending between the inner radial end and the outer radial end and contactable by the inner annular case such that the annular body retains the inner annular case disposed within the outer annular case.

6. The seal assembly as recited in claim 5 wherein the flange of the outer annular case has a first radial section connected with a remainder of the outer annular case, a second radial section spaced axially from the first radial section, and a radially-outermost central section extending between and connecting the first and second radial sections, the annular groove being defined between the first and second radial sections and having an open inner radial end, the retainer annular body extending radially inwardly from the inner end of the flange.

7. The seal assembly as recited in claim 6 wherein the flange groove has an axial width defined between the first and second radial sections of the flange and the retainer annular body has an axial thickness, the retainer thickness being greater than the flange width such that the two flange radial sections frictionally engage the retainer.

8. The seal assembly as recited in claim 5 wherein the retainer is formed of a rigid polymeric material.

9. The seal assembly as recited in claim 5 wherein the retainer annular body has opposing first and second axial ends, the retention surface being provided on the first axial end, and a plurality of drainage passages extending axially between the first and second axial ends and spaced circumferentially about the centerline of the retainer.

10. The seal assembly as recited in claim 5 wherein the retainer has a central bore with an inside diameter and the inner case has an outside diameter greater than the inside diameter of the retainer such that at least a portion of the radial retention surface extends radially inwardly of the inner annular case.

11. The seal assembly as recited in claim 5 wherein the outer annular case has a centerline and the retainer is engageable with the inner annular case to prevent axial displacement of the inner annular case in a first direction along the centerline of the outer annular case.

12. The seal assembly as recited in claim 5 wherein the outer annular case has an outer axial portion with an outer circumferential surface and the seal assembly further comprises a gasket disposed about the outer circumferential surface of the outer case and disposed axially adjacent to the flange.

13. The seal assembly as recited in claim 5 further comprising:
- a primary sealing member coupled with the seal mounting portion of the outer annular case and sealingly engageable with an outer circumferential surface of the inner axial portion of the inner annular case; and
- at least one secondary seal lip coupled with the outer axial portion of the inner annular case and sealingly engageable with an inner circumferential surface of the outer axial portion of the outer annular case.

14. The seal assembly as recited in claim 13 wherein an outer circumferential surface of the outer axial portion of the outer annular case is frictionally engageable with the housing bore and an inner circumferential surface of the inner axial portion of the inner annular case is frictionally engageable with the shaft.

15. A seal assembly for sealing an annular space between a shaft and a housing, the shaft having an outer surface and the housing having a bore and a radial end surface extending outwardly from the bore, the seal assembly comprising:
- an outer annular case disposeable within the housing bore and including an outer axial portion having opposing first and second axial ends, a flange extending outwardly from the first axial end of the outer axial portion and defining an annular groove, a radial portion extending inwardly from the second axial end of the outer axial portion and a seal mounting portion extending axially from the radial portion and toward the first axial end;
- an inner annular case including an inner axial portion disposeable about the shaft outer surface, a radial portion extending radially outwardly from the inner axial portion and an outer axial portion extending from an outer end of the radial portion and disposed about the seal mounting portion of the outer annular case;
- a primary sealing member attached to the seal mounting portion of the outer annular case and sealingly engageable with the inner axial portion of the inner annular case; and
- a retainer including an annular body with a centerline, an outer radial end disposed within the flange groove, an inner radial end disposeable about the shaft and a radial retention surface extending between the inner and outer ends and contactable by the inner annular case such that the annular body retains the inner annular case disposed within the outer annular case.

16. The seal assembly as recited in claim 15 wherein the outer axial portion of the outer case has an outer circumferential surface frictionally engageable with the housing bore and the seal assembly further comprises a gasket disposed about the outer circumferential surface of the outer case and axially adjacent to the flange so as to seal between the flange and the outer axial portion of the outer annular case.

17. The seal assembly as recited in claim 15 wherein the retainer is formed of a rigid polymeric material.

18. The seal assembly as recited in claim 15 wherein the retainer annular body has opposing first and second axial ends, the retention surface being provided on the first axial end, and a plurality of drainage passages extending axially between the first and second axial ends and spaced circumferentially about the centerline.

\* \* \* \* \*